US012164914B2

(12) United States Patent
Vacchi et al.

(10) Patent No.: US 12,164,914 B2
(45) Date of Patent: Dec. 10, 2024

(54) REMOVING INACTIVE CODE TO FACILITATE CODE GENERATION

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 2 days.

(21) Appl. No.: 17/752,757

(22) Filed: May 24, 2022

(65) Prior Publication Data

US 2023/0385056 A1  Nov. 30, 2023

(51) Int. Cl.
*G06F 8/72* (2018.01)

(52) U.S. Cl.
CPC ..................................... *G06F 8/72* (2013.01)

(58) Field of Classification Search
CPC ........................................................ G06F 8/72
See application file for complete search history.

(56) References Cited

U.S. PATENT DOCUMENTS

| 7,543,284 | B2 | 6/2009 | Bolton et al. |
| 9,436,449 | B1 | 9/2016 | Chandnani et al. |
| 10,956,138 | B1 | 3/2021 | Soquet |
| 2002/0013938 | A1 | 1/2002 | Duesterwald et al. |
| 2006/0248517 | A1* | 11/2006 | Bartsch ............... G06F 8/48 717/140 |
| 2012/0272224 | A1* | 10/2012 | Brackman ............. G06F 8/54 717/151 |
| 2016/0041824 | A1* | 2/2016 | Bostick ............... G06F 8/72 717/123 |

FOREIGN PATENT DOCUMENTS

CN           112148292 A      12/2020

OTHER PUBLICATIONS

Author Unknown, "CA1—Dead Code Eliminator," CS 4501—Compilers Practicum, 2016, https://web.eecs.umich.edu/~weimerw/2016-ldi/ca1.html, 7 pages.
Van Breugel, F. et al., "Dead-Path-Elimination in BPEL4WS," Proceedings of the Fifth International Conference on Application of Concurrency to System Design (ACSD'05), Jun. 7-9, 2005, Saint Malo, France, IEEE, 10 pages.
Weidlich, M. et al., "Realising Dead Path Elimination in BPMN," 2009 IEEE Conference on Commerce and Enterprise Computing, Jul. 20-23, 2009, Vienna, Austria, IEEE, 9 pages.

* cited by examiner

*Primary Examiner* — Phillip H Nguyen
(74) *Attorney, Agent, or Firm* — Dority & Manning, P.A.

(57) ABSTRACT

Removing inactive components to facilitate code generation. A first file that includes a first group of components in a first notation syntax and a second file that includes a second group of components in a second notation syntax is received. A first set of inactive components of the first group of components is identified. A second set of inactive components of the second group of components is identified. The components of the first group of components and the second group of components that are not marked as inactive components are active components. Code to be executed based on the active components is generated.

16 Claims, 7 Drawing Sheets

REMOVING INACTIVE CODE TO FACILITATE CODE GENERATION

BACKGROUND

Business automation is a technological area of growing interest and importance that facilitates the implementation of a business application on a computing system via a standardized notation system.

SUMMARY

In various examples disclosed herein, provided is a method and system for removing inactive components to facilitate code generation. A first component (process, task, decision service, rules, etc.) of a first file (e.g., a business asset) may refer to a second component of a second file, but depending on the type of reference, the range of possible inputs, the second component of the second file may or may not refer to any additional components in the second file. When the time comes to preprocess the file to create code generated artifacts that are to be executed at run-time, a smaller code base can be achieved by ensuring that the code does not contain references to the inactive components, or the components that will not be executed at run-time.

In an example, a method includes receiving, by a computing system comprising one or more processor devices of one or more computing devices, a first file comprising a first group of components in a first notation syntax and a second file comprising a second group of components in a second notation syntax, wherein a first component in the first group of components comprises a reference to a second component of the second group of components. The method also includes identifying a first set of inactive components of the first group of components. The method also includes identifying a second set of inactive components of the second group of components based on the reference to the second component of the second group of components, wherein the first group of components and the second group of components that are not in the first set of inactive components and the second set of inactive components are active components. The method also includes generating code to be executed based on the active components.

In an example, a computing system includes one or more computing devices, the one or more computing devices comprising one or more processor devices, the one or more processor devices to receive a first file comprising a first group of components in a first notation syntax and a second file comprising a second group of components in a second notation syntax, wherein a first component in the first group of components comprises a reference to a second component of the second group of components. The processor devices also identify a first set of inactive components of the first group of components. The processor devices also identify a second set of inactive components of the second group of components based on the reference to the second component of the second group of components, wherein the first group of components and the second group of components that are not in the first set of inactive components and the second set of inactive components are active components. The processor devices also generate code to be executed based on the active components.

In an example, a non-transitory computer-readable storage medium includes executable instructions to cause one or more processor devices of one or more computing devices to receive a first file comprising a first group of components in a first notation syntax and a second file comprising a second group of components in a second notation syntax, wherein a first component in the first group of components comprises a reference to a second component of the second group of components. The instructions further cause the one or more processor devices to identify a first set of inactive components of the first group of components. The instructions further cause the one or more processor devices to identify a second set of inactive components of the second group of components based on the reference to the second component of the second group of components, wherein the first group of components and the second group of components that are not in the first set of inactive components and the second set of inactive components are active components. The instructions further cause the one or more processor devices to generate code to be executed based on the active components.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but, unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "business automation" as used herein refers to the use of predetermined modeling and notation systems that facilitate the modeling of business processes and/or decision services for visualization purposes, and also facilitate the implementation of such business processes and decision services through software instructions that, when interpreted, or compiled and executed, implement a desired business system on one or more computing devices.

Business process modeling is the activity of representing the processes of an enterprise, where the processes can be a series of tasks, events, conditions, and other activities that are recorded and tracked in a manner that can enable analysts to better understand the systems and operations of the enterprise, There are many different methodologies and notation systems that can be used to track, model, and simulate the processes, and, in a cloud-oriented business process automation platform, these can lead to a large set of heterogenous source files that are not necessarily interoperable. Even files that use the same methodology or notation system may not be interoperable since the files may contain references to different files that are not compatible.

During business process modeling, the operational specifications of business processes can be captured, and the data of business processes, known as "artifacts," can be described by characterizing business-relevant data objects, their lifecycles, and related services. Business process modeling tools provide business users with the ability to model their business processes, implement and execute those models, and refine the models based on as-executed data. As a result, business process modeling tools can provide transparency into business processes, as well as the centralization of corporate business process models and execution metrics. The business process modeling tools can also enable simulation functionality that allows for pre-execution modeling and simulation to explore "what-if" scenarios with different inputs. Once the modeling and simulation is performed, the files comprising the processes can be utilized at run-time or when performing business process automation.

Examples of such modeling and notation systems include, by way of non-limiting example, Business Process and Model Notation (BPMN), available at www.omg.org, Decision Model and Notation (DMN), available at www.omg.org, Predictive Model Markup Language (PMML), available at www.dmg.org, and Drools Rules Language (DRL), available at www.drools.org. Generally, a file utilizing a modeling and notation system will be referred to herein collectively as a business asset. Each business asset may comprise an individual file that describes and contains software instructions to implement one or more components, such as processes or decision services, and instructions suitable for visualizing in a user interface the one or more components that are implemented by the business asset. Together, a related collection of business assets implement a particular business application that can execute on one or more computing systems to provide desired functionality.

In various examples disclosed herein, provided is a method and system for removing inactive components to facilitate code generation. A first component (process, task, decision service, rules, etc.) of a first file (e.g., a business asset) may refer to a second component of a second file; but depending on the type of reference, the range of possible inputs; the second component of the second file may or may not refer to any additional components in the second file. These additional components could be marked as inactive components. When the time comes to preprocess the file to create code generated artifacts that are to be executed at run-time a smaller code base can be achieved by ensuring that the code does not contain references to the inactive components, or the components that will not be executed at run-time.

In an example, there can be a separate elimination processes to identify inactive components for each file of a different notation syntax. For instance, if the first file is a BPMN file, the first elimination process can be a BPMN elimination process, if the second file is a DMN file, the second elimination process can be a DMN elimination process. Each type of elimination process can be configured to process a data flow associated with the respective file's notation syntax in order to identify any inactive or unreached components. In an example; if the first component in a first file references the second component in the second file, the first elimination process can transfer contextual information to the second elimination process to facilitate the second elimination process identifying any inactive components in the second file based on the contextual information. The contextual data can include the range of potential inputs to the second component, the global variables, alive local variables, etc.

Figure 1:
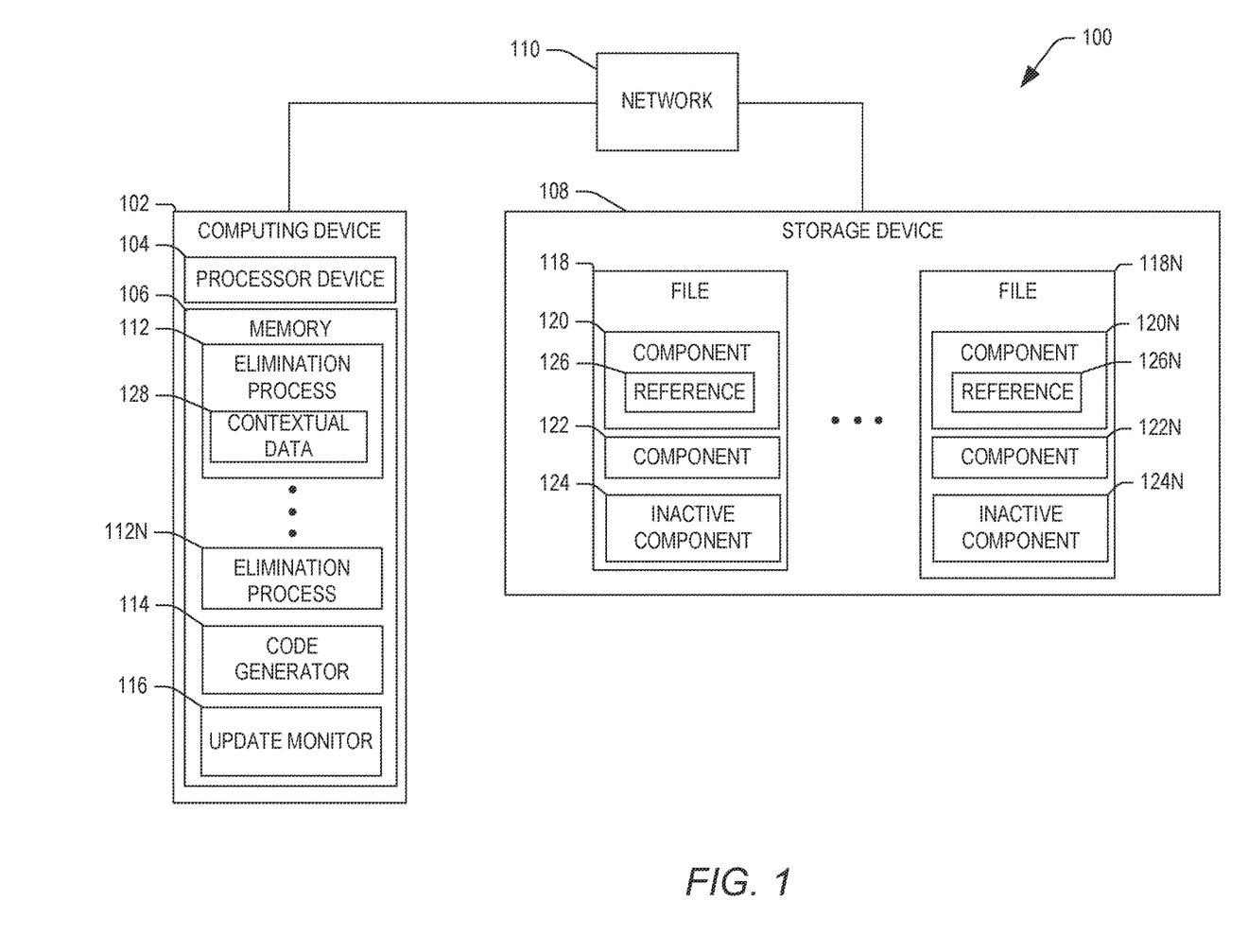
FIG. 1 illustrates a block diagram of an example computing system for removing inactive components to facilitate code generation in accordance with various aspects of the subject disclosure.

Turning now to FIG. 1, illustrated is a block diagram of an example computing system 100 for removing inactive components to facilitate code generation. The computing system 100 includes a computing device 102, which in turn includes a processor device 104 and a memory 106. The computing device 102 may include, or be communicatively coupled to, a storage device 108. In some examples, the computing device 102 may access the storage device 108 via a network 110. The memory 106 can include elimination processes 112-112N, a code generator 114 and an update monitor 116. The elimination processes 112-112N can each be associated with respective types of notation syntaxes (e.g., BPMN, DMN, DRL, PMML, etc.).

The storage device 108 can include files 118-118N that each comprise information associated with components 120-120N, 122-122N, and 124-124N where some of the components (e.g., the components 120-120N) may include references 126-126N to other components, either in the same file as the component itself, or in a different file. For example, the reference 126 could reference the component 120N, while the reference 126N could reference the component 122N, One or more of the components could be inactive components (e.g., the components 124-124N) that are not referenced, called, or otherwise used in any dataflows associated with the files 118-118N.

The components 120-120N, 122-122N, and 124-124N can be decision services or processes or can represent any steps in a business process, including flow objects (e.g., events, activities, and gateways), connecting objects (e.g., sequence flow, message flow, and/or association, etc.), swim lanes, artifacts, decision steps, and other elements of a business process identified in the files 118-118N. It is to be appreciated that, although the files 118-118N are each depicted in FIG. 1 as including three component each, this is merely for the sake of simplicity and that the files 118-118N can contain any number of components. Likewise, while the components 120-120N are the only components depicted in FIG. 1 as having references to other components, in other examples, a plurality of the components 120-120N, 122-122N, and 124-124 can refer to other components, or even multiple other components, depending on the data inputs to those components.

In an example, the files 118-118N can be in one or many different formats, using different modeling and/or notation systems. For example, the files 118-118N can include one or more of DMN files, BPMN files, PMML files, rules files written using DRL, or files using other formats or notation systems. The DMN files can facilitate automated decisioning; the BPMN files can be used to encode business processes; the PMML files can be used to describe predictive models; and the DRL files can comprise information related to a business rule management system.

Once the files 118-118N are received, the computing device 102 via the processor device 104 can initiate elimination processes (e.g., the elimination processes 112-112N) to identify inactive components in each of the files 118-118N. The computing device 102 can initiate a separate elimination process for each type of file (e.g., BMPN, DMN, PMML, DRL, and etc.) that is present. Each of the elimination processes 112-112N can be specially configured to identify inactive components in respective notation syntaxes. It is to be appreciated that that while the elimination process 112-112N are referred to as processes, they could be applications or programs being executed in the memory 106 or in a virtual machine or container.

In an example, the elimination process 112 can be associated with the same notation syntax of the file 118, and the elimination process 112N can be associated with the same notation syntax of the file 118N. The elimination process 112 can identify inactive components (e.g., the inactive component 124 of the group of components 120, 122, and 124 in the file 118) in file 118, while the elimination process 112N can identify the inactive component 124N of the group of components 120N, 122N, and 124N. While, for purposes of simplicity, the files 118-118N are shown with a single inactive component each, in other examples, there could be a plurality of inactive components in one or more of the files 118-118N. The inactive components of each of the files 118-118N can be referred to as sets of inactive components, where a set could have as few as zero inactive components.

In an example, the elimination process 112 can determine whether a component in the file 118 is active based on whether any of the components reference other components in the file, with a range of potential inputs. If for example, the reference 126 in the component 120 references a component (e.g. the component 120N in the file 118N), the elimination process 112N can be initiated to determine if there are any inactive components in the file 118N so as to avoid generating code based on all of the file 118N. In an example, based on the reference 126, and which of the components 120N, 122N, and 124N that the reference 126 references, the elimination process 112N can determine that the component 124N is inactive, as the reference 126N in the component 120N may only reference the component 122N and not the inactive component 124N.

In an example, the elimination process 112 can also determine a contextual data 128 about the reference 126, the component 120, or other features and/or aspects of the file 118, and the elimination process 112N can use the contextual data to help identify the inactive component 124N in the file 118N, For example, the contextual data 128 can include information about the global variables, alive local variables, etc. associated with the reference 126 and/or the component 120.

In an example, the elimination processes 112-112N can determine whether any of the components 120-120N, 122-122N, or 124-124N should be flagged as being necessary components or components that should otherwise always be included in the code generated by the code generator 114 even if the components are inactive on one or more occasions. In an example, any components referenced by the flagged components can also be flagged.

Once the inactive components 124-124N are identified, the code generator 114 can generate code to be executed based on the active components, where the active components (e.g., components 120, 122, 120N, and 122N) are the components that are not identified as inactive. The code that includes references to the active components is thus smaller in size than if the code generator 114 naively preprocessed into code all of the files 118-118N. The code generated by the code generator 114 can be executed at a later time by a business process automation platform. The code generator 114 can generate any type of executable code and is not limited to creating executable representations of the original files 118-118N, The code generated by the code generator 114 can include (but not be limited to): representational state transfer (REST) endpoints, adapters for message receivers and producers (e.g., for cloud events), adapters for KNative events (e.g., on a Kogito® business process automation platform), Java mappings for data model representations, automated unit tests for REST endpoints, automated integration tests for the message adapters, generation of REST application programming interface (API) specification/manifests (OpenAPI), automated documentation of the business asset (e.g., entry points of a BPMN, decision services of a DMN, etc.), Kubernetes deployment templates, security policies and run-time validation through keycloak (e.g., in BPMN authorized users to a service/user task), and many other types of code.

The update monitor 116 can determine that a modification has been made to either the file 118 or the file 118N and then can cause one or more of the elimination processes 112-112N to be reinitiated or active again to update the first set of inactive components and the second set of inactive components before the code generator 114 updates the code to be executed.

Because the elimination processes 112-112N, the code generator 114, and the update monitor 116 are components of the computing device 102, functionality implemented by the elimination processes 112-112N, the code generator 114, and the update monitor 116 may be attributed to the computing device 102 generally. Moreover, in examples where the elimination processes 112-112N, the code generator 114, and the update monitor 116 comprise software instructions that program a processor device (e.g., the processor device 104) to carry out functionality discussed herein, functionality implemented by the elimination processes 112-112N, the code generator 114, and the update monitor 116 may be attributed herein to the processor device 104 of the computing device 102.

Finally, it is noted that while, for purposes of illustration and simplicity, the examples are illustrated as being implemented by a computing system that comprises a single computing device that, in turn, comprises a single processor device. In practice the examples disclosed herein may be implemented in a computing system that comprises any number of computing devices, each of which may comprise one or more processor devices. Thus, irrespective of the implementation, the examples may be implemented on a computing system that includes one or more computing devices, wherein the one or more computing devices comprise one or more processor devices, and wherein the one or more processor devices are configured to implement functionality disclosed herein.

Figure 2:
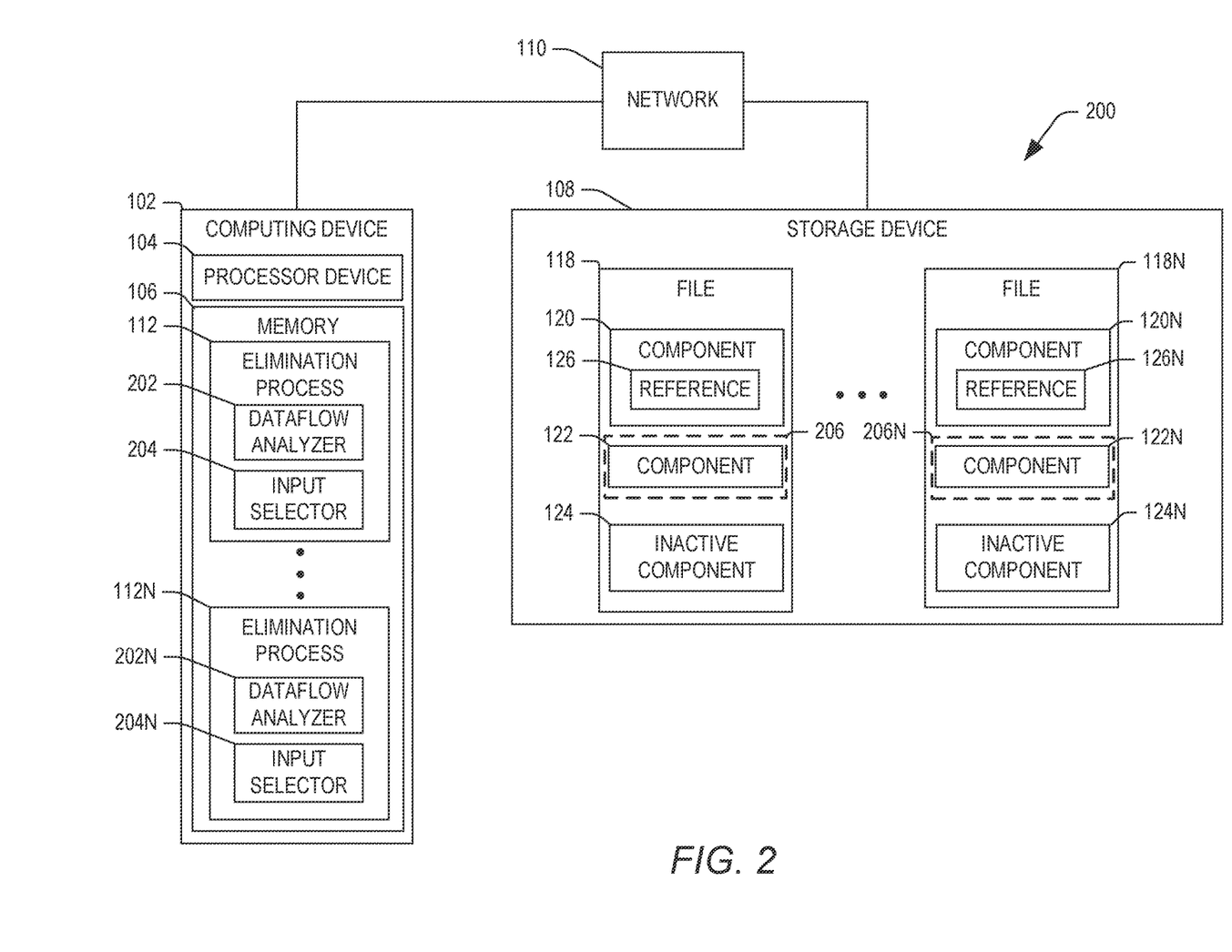
FIG. 2 illustrates a block diagram of an example computing system for removing inactive components to facilitate code generation in accordance with various aspects of the subject disclosure.

Turning now to FIG. 2, illustrated is a block diagram of an example computing system 200 for removing inactive components to facilitate code generation in accordance with various aspects of the subject disclosure. The computing system 200 can include more detail on the various components associated with the elimination processes 112-112N. For example, the elimination processes 112-112N can include dataflow analyzers 202-202N and input selectors 204-204N to facilitate the identification of the inactive components 124-124N.

In an example, the dataflow analyzer 202 can identify a first component or initial component of the components 120-124 from which to begin a dataflow analysis. The dataflow analyzer 202 can identify the initial components based on domain specification information associated with the notation syntax of the file 118. Once identified, the input selector 204 can determine a plurality of inputs to apply to the initial component to see what are the outputs of the initial component. For example, the input selector 204 can select an input to apply to the initial component 120, and determine that based on the input, the initial component 120 contains the reference 126 to the component 122 and/or the component 120N. This process can be iteratively repeated for each downstream component until all the downstream components are identified.

In an example, there may be no possible input to the initial component 120 that would result in a reference to the component 124, thus the component 124 is identified as inactive. Alternatively, after identifying a group of downstream components 206 that includes the component 122, the inactive component 124 is identified as the inactive component 124 and is not included in the group of downstream components 206.

In an example, the input selector 204N can apply an input to the component 120N where the input is the output of the component 120. The dataflow analyzer 202N can then identify which downstream components (e.g., downstream component 122N) is in a downstream group of the components 206N. The inactive component 124N can be identified in a similar manner to how the inactive component 124 is identified.

In an example, the dataflow analyzers 202-202N can determine the group of downstream components 206-206N based on the shape of the input that is provided to the upstream components. For example, the input may not activate specific code paths where for a set of rules, if only a specific object type T may be inserted into working memory, even if there are rules that are able to match different types of objects (U, V, Z, distinct and not inheriting from T), those rules will not be activated.

Figure 3:
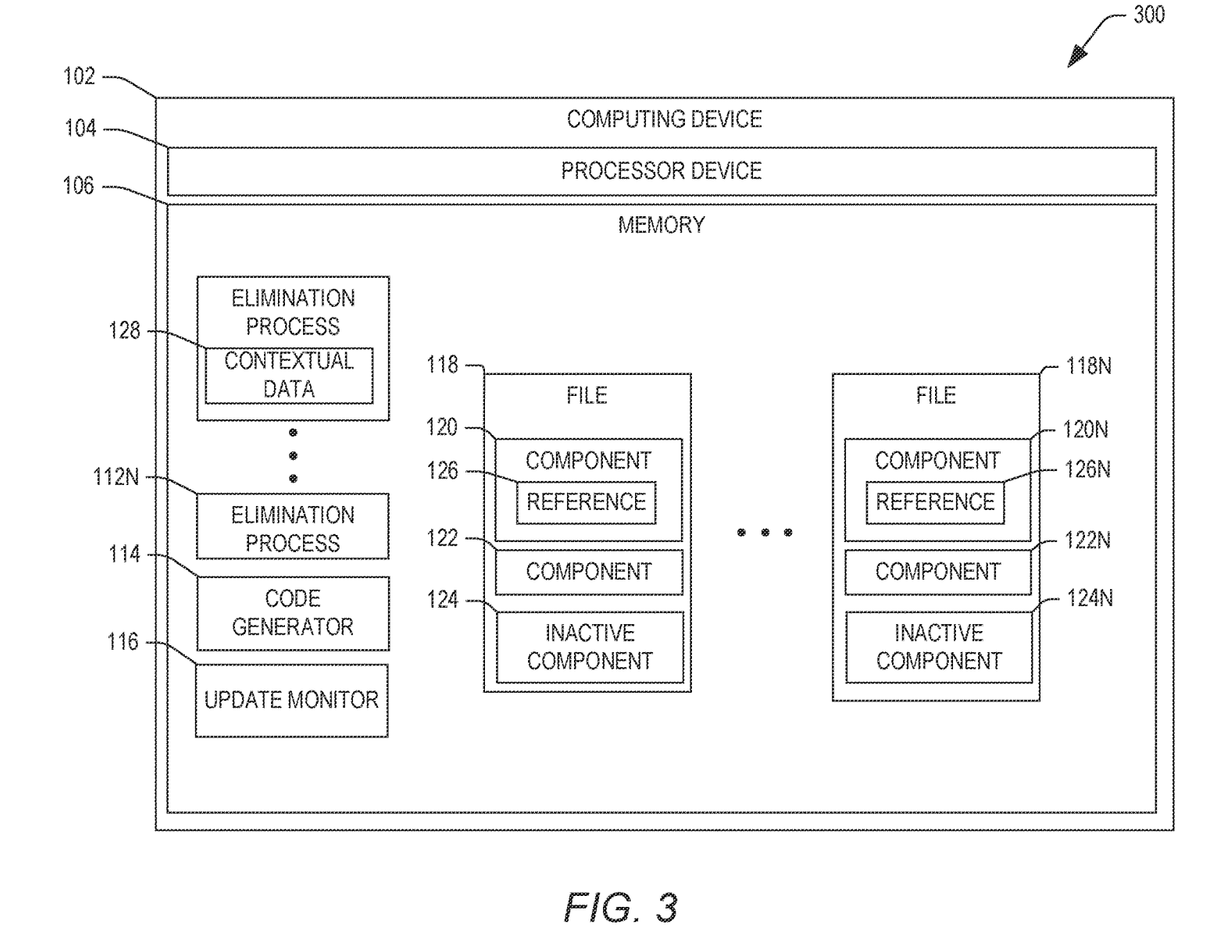
FIG. 3 illustrates a block diagram of an example computing system for removing inactive components to facilitate code generation in accordance with various aspects of the subject disclosure.

Turning now to FIG. 3, illustrated is a block diagram of an example computing system 300 for removing inactive components to facilitate code generation. The computing system 300 in FIG. 3 depicts a different configuration of the computing system 100 shown in FIG. 1. Instead of the storage device 108 being separate from the computing device 102, and communicatively coupled via the network 110, in the example shown in FIG. 3, the files 118-118N can be stored in the memory 106 or in a storage device within the computing device 102.

Figure 4:
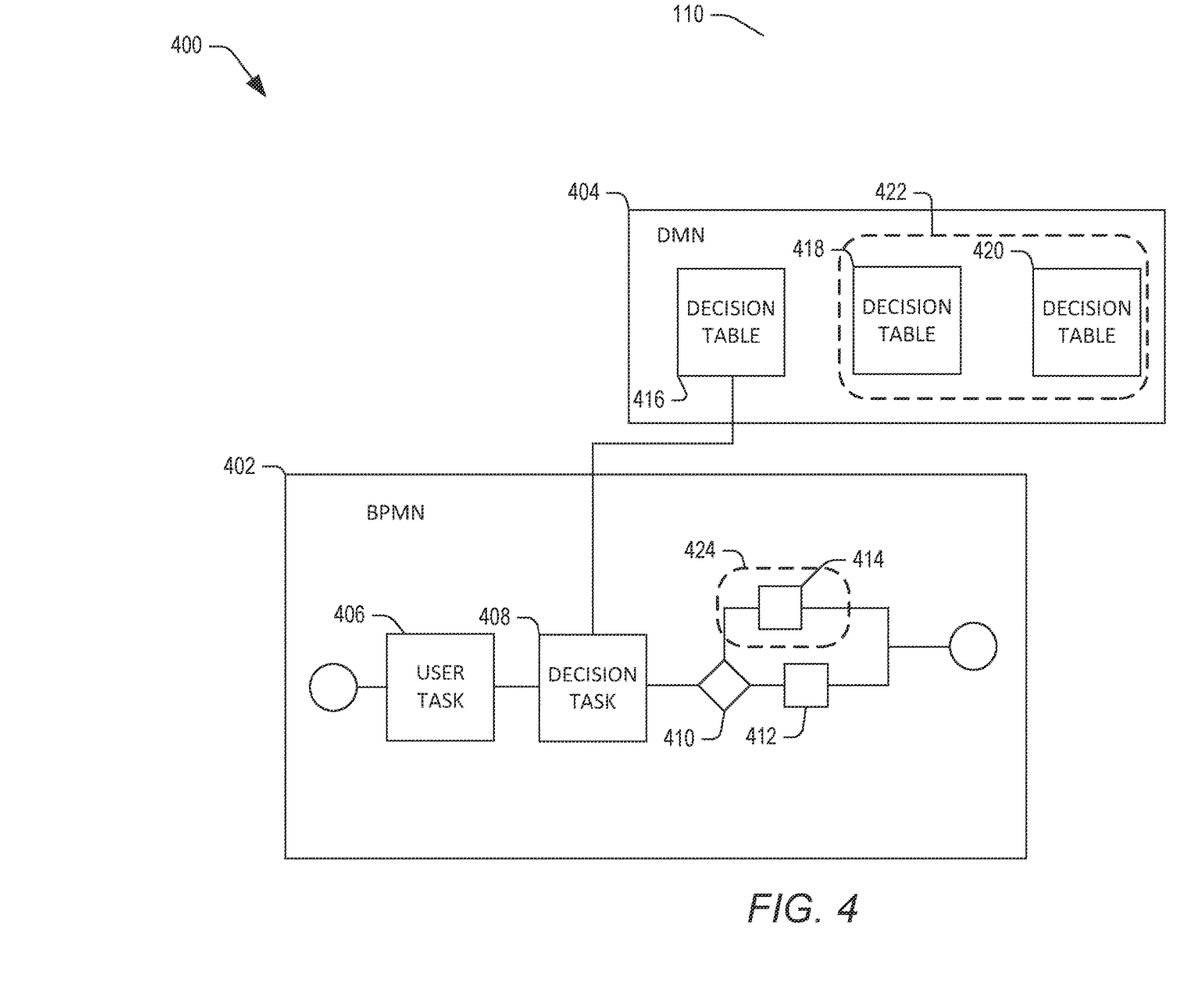
FIG. 4 illustrates a block diagram of business process systems with inactive components in accordance with various aspects of the subject disclosure.

In FIG. 4, illustrates a block diagram of an exemplary business process system 400 with inactive components in accordance with various aspects of the subject disclosure.

In an example, the business process system 400 can include a BPMN file 402 and a DMN file 404. The BPMN file 402 can include a series of components 406-414 and DMN file 404 can include components 416-420.

The components 406-414 in the BPMN file 402 can be a representation tasks or steps or process variables in a business process, while the components 416-420 can represent decision tables which can be thought of as respective sets of "if/else" branches.

In an example, the output of the component 406 proceeds to the component 408 which can output to the component 410. However, the component 408 can contain a reference to the component 416 in the DMN file 404. The decision table in the component 416 can be used by the component 408 to generate the output to the component 410. Based on the reference from the component 408 and any contextual data associated with the component 408 or BPMN file 402, an elimination process (e.g., elimination process 112N) can determine that the component 418 and the component 420 are inactive and thus form a set of inactive components 422.

The output of component 408 can then be used as an input to the component 410, but based on the input to the component 410, another elimination process (e.g., the elimination process 112) can determine that the component 414 is inactive and thus a part of a set of inactive components 424. Since the components 414 and 418-420 are inactive with respect to the business process system 400, any code generated does not include code related to the inactive components, thus reducing the size and complexity of the code that will be executed at run-time.

Figure 5:
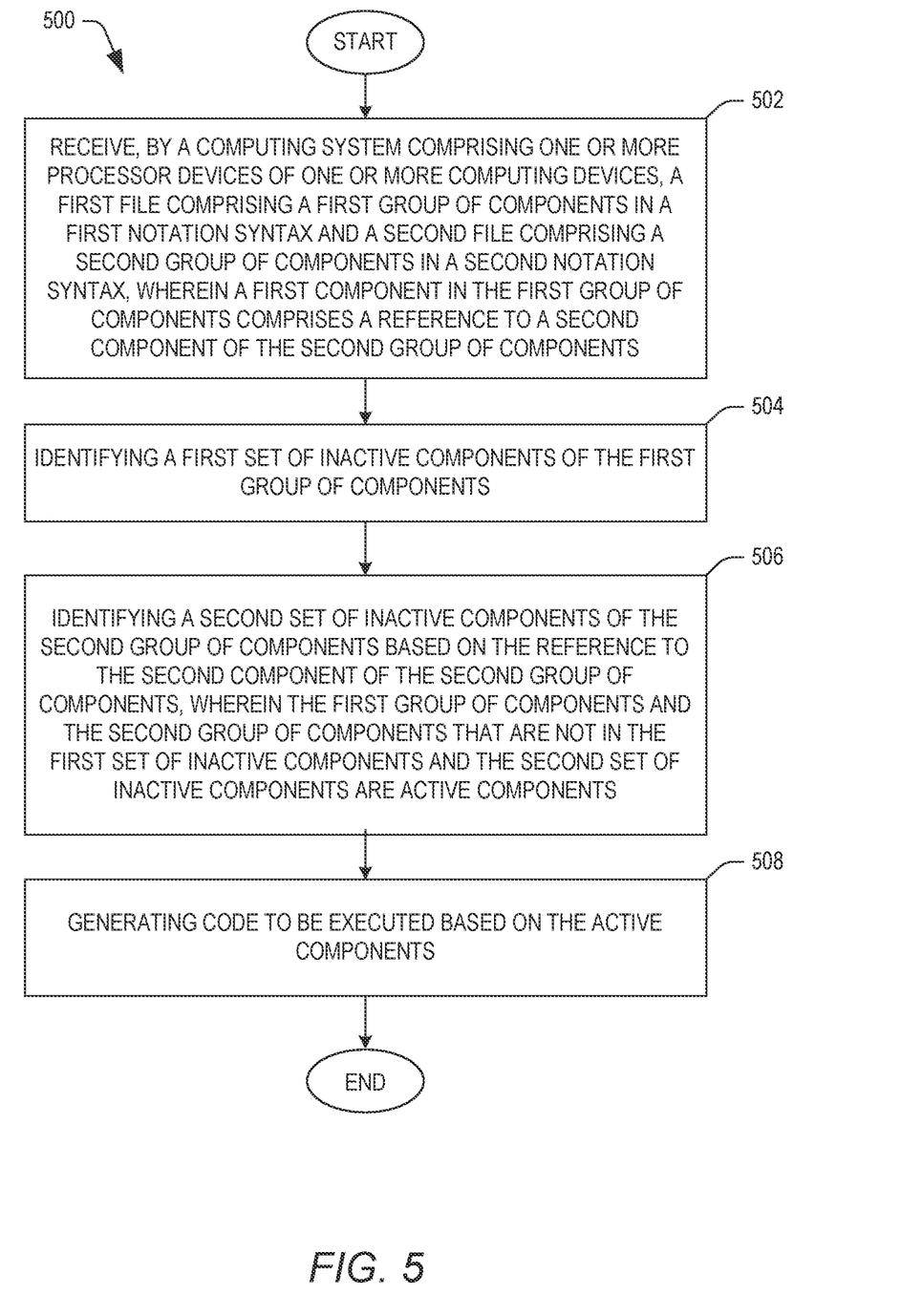
FIG. 5 illustrates a flowchart of an example method for removing inactive components to facilitate code generation in accordance with various aspects of the subject disclosure.

FIG. 5 illustrates a process in connection with the aforementioned computing systems 100, 200, and/or 300. FIG. 5 will be discussed in conjunction with FIG. 1. While for purposes of simplicity of explanation the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 5, illustrated is a flowchart of an example method 500 for removing inactive components to facilitate code generation in accordance with various aspects of the subject disclosure.

At step 502, the method 500 can include receiving, by a computing system (e.g., the computing device 102) comprising one or more processor devices (e.g., the processor device 104) of one or more computing devices, a first file (e.g., the file 118) comprising a first group of components (e.g., the components 120-124 in a first notation syntax (e.g., one of BPMN, DMN, PMML, DRL, etc.) and a second file (e.g., the file 118N) comprising a second group of components (e.g., the components 120N-124N) in a second notation syntax (e.g., one of BPMN, DMN, PMML, DRL, etc.), wherein a first component 120 in the first group of components 120-124 comprises a reference 126 to a second component (e.g., the component 120N) of the second group of components 120N-124N.

At step 504, the method 500 can include identifying (e.g., by the elimination process 112) a first set of inactive components (e.g., the inactive component 124 of the first group of the components 120-124).

At step 506, the method 500 can include the identifying (e.g., by the elimination process 112N) a second set of inactive components (e.g., the inactive component 124N) of the second group of components 120N-124N based on the reference to the second component 120N of the second group of components 120N-124N.

At step 508, the method 500 can include generating code (e.g., by the code generator 114) to be executed based on the active components.

Figure 6:
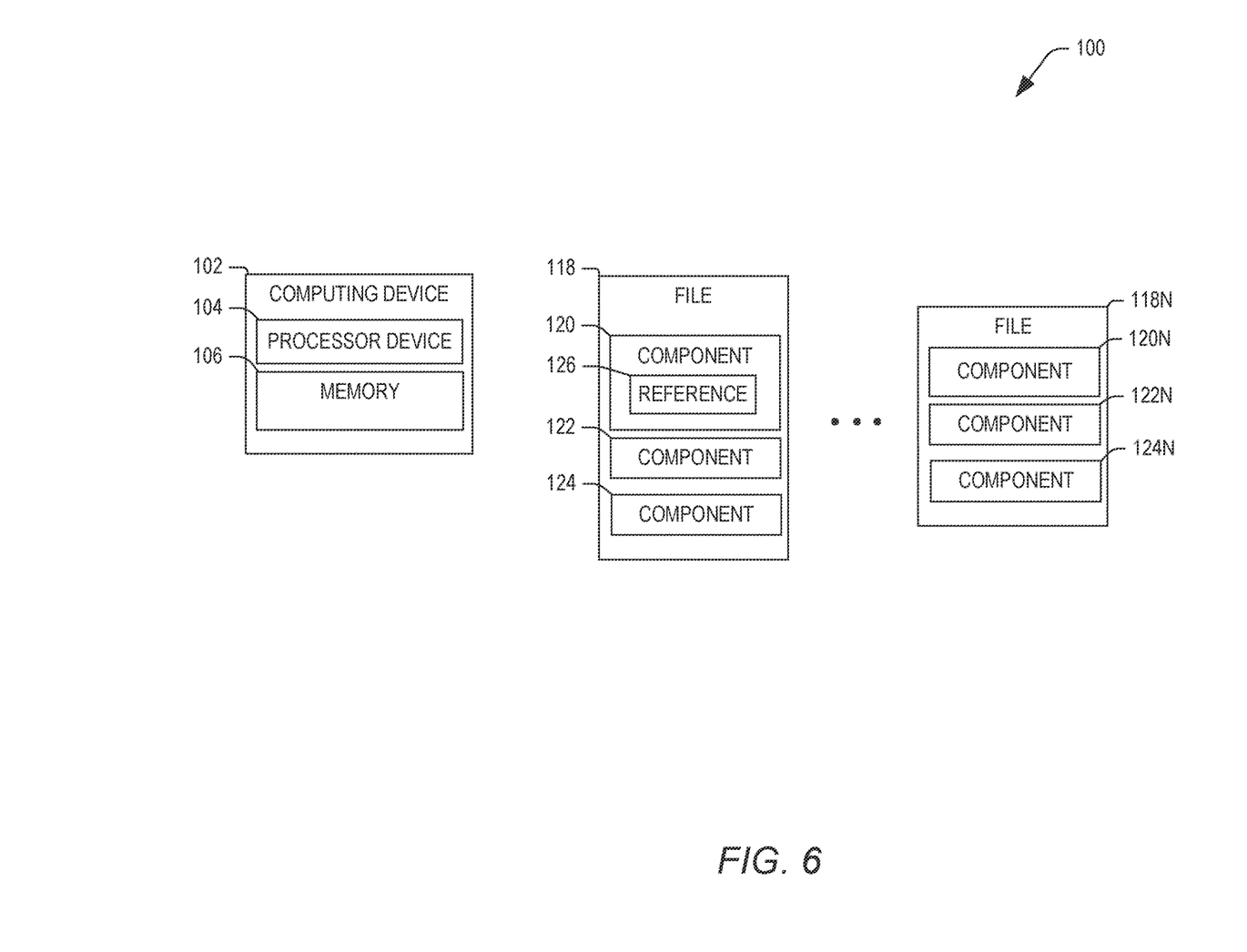
FIG. 6 illustrates a simplified block diagram of the computing system illustrated in FIG. 1 in accordance with various aspects of the subject disclosure.

FIG. 6 is a simplified block diagram of the computing system 100 illustrated in FIG. 1 in accordance with various aspects of the subject disclosure. The computing system 100 includes the computing device 102 that includes the memory 106 coupled to the processor device 104. The processor device 104 is to receive the first file 118 comprising a first group of the components 120-124 in a first notation syntax and the second file 118N comprising a second group of the components 120N-124N in a second notation syntax, wherein the first component 120 in the first group of the components 120-124 comprises the reference 126 to the second component 120N of the second group of the components 120N-124N, The processor device 104 is further to identify a first set of inactive components (e.g., inactive component 124) of the first group of the components 120-124. The processor device 104 is further to identify a second set of inactive components (e.g., the inactive component 124N) of the second group of the components 120N-124N based on the reference 126 to the second component 120N of the second group of components where the first group of components and the second group of components that are not in the first set of inactive components and the second set of inactive components are active components. The processor device 104 is further to generate code to be executed based on the active components.

Figure 7:
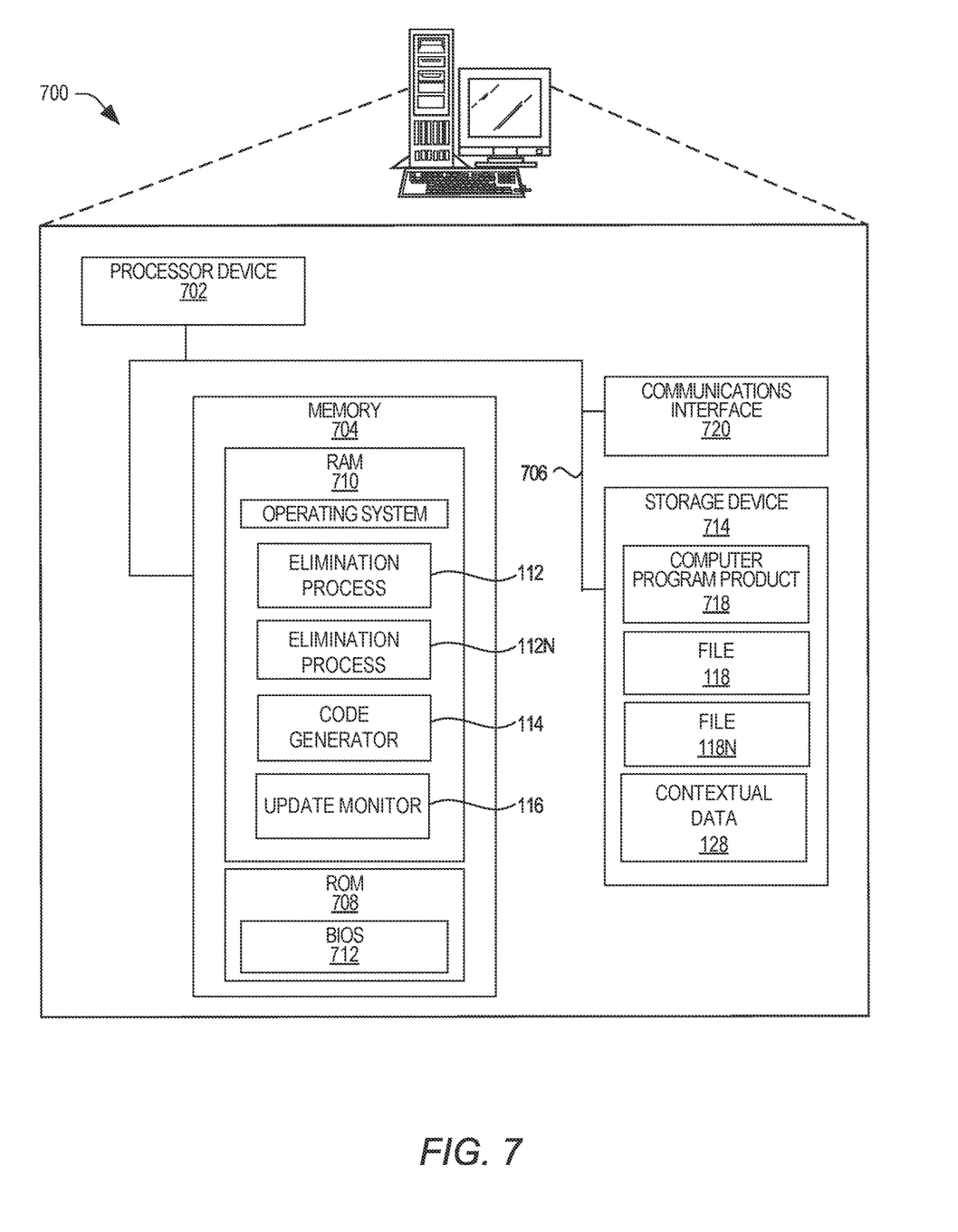
FIG. 7 illustrates an example block diagram of a computer that can be operable to execute processes and methods in accordance with various aspects of the subject disclosure.

FIG. 7 is a block diagram of a computing device 700 suitable for implementing the computing device 102 according to one example. The computing device 700 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 700 includes a processor device 702, a system memory 704, and a system bus 706. The system bus 706 provides an interface for system components including, but not limited to, the system memory 704 and the processor device 702, The processor device 702 can be any commercially available or proprietary processor.

The system bus 706 may be any of several types of bus structures that may further interconnect to a memory bus (with or without a memory controller), a peripheral bus, and/or a local bus using any of a variety of commercially available bus architectures. The system memory 704 may include a non-volatile memory 708 (e.g., read-only memory (ROM), erasable programmable read-only memory (EPROM), electrically erasable programmable read-only memory (EEPROM, etc.), and a volatile memory 710 (e.g., random-access memory (RAM)). A basic input/output system (BIOS) 712 may be stored in the non-volatile memory 708 and can include the basic routines that help to transfer information between elements within the source computing device 700. The volatile memory 710 may also include a high-speed RAM, such as static RAM, for caching data.

The computing device 700 may further include or be coupled to a non-transitory computer-readable storage medium such as a storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like, Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 714 and in the volatile memory 710, including an operating system and one or more components, such as the elimination processes 112-112N, the code generator 114 or the update monitor 116 if the computing device 700 is implementing the computing device 102. Such components may implement the functionality described herein in whole or in part. It is to be appreciated that the examples can be implemented with various commercially available operating systems or combinations of operating systems.

The files 118-118N and the contextual data 128 can also be stored in the storage device 714. AH or a portion of the examples may be implemented as a computer program product 718 stored on a transitory or non-transitory computer-usable or computer-readable storage medium, such as the storage device 714, which includes complex programming instructions, such as complex computer-readable program code, to cause the processor device 702 to carry out the steps described herein. Thus, the computer-readable program code can comprise software instructions for implementing the functionality of the examples described herein when executed on the processor device 702.

The computing device 700 may also include a communications interface 720 suitable for communicating with a mobile wireless network or other computing devices as appropriate or desired.

Those skilled in the art will recognize improvements and modifications to the preferred examples of the disclosure. All such improvements and modifications are considered within the scope of the concepts disclosed herein and the claims that follow.

What is claimed is:

1. A method comprising:
  receiving, by a computing system comprising one or more processor devices of one or more computing devices, a first file comprising a first group of components written in accordance with a first notation syntax and a second file comprising a second group of components written in accordance with a second notation syntax, wherein a first component in the first group of components comprises a reference to a second component of the second group of components;
  identifying a first set of inactive components of the first group of components by iteratively applying a plurality of inputs to an initial component in the first group of components and determining that a downstream component in the first group of components is not referenced in response to the plurality of inputs;
  identifying a second set of inactive components of the second group of components based on the reference to the second component of the second group of components, wherein the first group of components and the second group of components that are not in the first set of inactive components and the second set of inactive components are active components; and generating computer-executable code operable to be subsequently executed based on the active components by a business process automation platform, wherein the computer-executable code omits the first set of inactive components and the second set of inactive components and includes the active components.

2. The method of claim 1, further comprising:
identifying the second set of inactive components of the second group of components based at least in part on contextual information about the first group of components.

3. The method of claim 1, wherein an inactive component of the first set of inactive components or the second set of inactive components is not referenced by another component in the first group of components and the second group of components.

4. The method of claim 1, wherein the identifying the first set of inactive components further comprises:
identifying the initial component of the first group of components;
applying the plurality of inputs to the initial component and identifying components referenced by the initial component based on the plurality of inputs;
iteratively applying pluralities of inputs to each of the components referenced by the initial component to identify a group of first downstream components; and
identifying the first set of inactive components by determining that the first set of inactive components are not in the group of first downstream components.

5. The method of claim 1, wherein the identifying the second set of inactive components further comprises:
applying an input to the second component of the second group of components wherein the input is an output of the first component, and identifying components referenced by the second component based on the input;
iteratively applying pluralities of inputs to each of the components referenced by the second component to identify a group of second downstream components; and
identifying the first set of inactive components by determining that the second set of inactive components are not in the group of second downstream components.

6. The method of claim 1, wherein at least one of the first notation syntax and the second notation syntax are at least one of a Decision Modeling and Notation (DMN) syntax, Business Process Model Notation (BPMN) syntax, Predictive Model Markup Language (PMML) syntax, and Drools Rule Language (DRL) syntax.

7. The method of claim 1, further comprising:
determining that that a modification has been made to the first file; and
updating the first set of inactive components and the second set of inactive components.

8. The method of claim 1, further comprising:
determining that a modification has been made to the second file; and
updating the second set of inactive components.

9. The method of claim 1, wherein:
identifying the first set of inactive components of the first group of components comprises identifying the first set of inactive components via a first elimination process operable to process a first data flow identified in the first notation syntax; and identifying the second set of inactive components of the second group of components comprises identifying the second set of inactive components via a second elimination process operable to process a second data flow identified in the second notation syntax.

10. A computing system comprising:
one or more computing devices, the one or more computing devices comprising one or more processor devices, the one or more processor devices to:
receive a first file comprising a first group of components written in accordance with a first notation syntax and a second file comprising a second group of components written in accordance with a second notation syntax, wherein a first component in the first group of components comprises a reference to a second component of the second group of components;
identify a first set of inactive components of the first group of components by iteratively applying a plurality of inputs to an initial component in the first group of components and determining that a downstream component in the first group of components is not referenced in response to the plurality of inputs;
identify a second set of inactive components of the second group of components based on the reference to the second component of the second group of components, wherein the first group of components and the second group of components that are not in the first set of inactive components and the second set of inactive components are active components; and
generate computer-executable code operable to be subsequently executed based on the active components by a business process automation platform, wherein the computer-executable code omits the first set of inactive components and the second set of inactive components and includes the active components.

11. The computing system of claim 10, wherein the one or more processor devices further:
identify the second set of inactive components of the second group of components based at least in part on contextual information about the first group of components.

12. The computing system of claim 10, wherein an inactive component of the first set of inactive components or the second set of inactive components is not referenced by another component in the first group of components and the second group of components.

13. The computing system of claim 10, wherein the one or more processor devices further:
identify the initial component of the first group of components;
apply the plurality of inputs to the initial component and identifying components referenced by the initial component based on the plurality of inputs;
iteratively apply pluralities of inputs to each of the components referenced by the initial component to identify a group of first downstream components; and
identify the first set of inactive components by determining that the first set of inactive components are not in the group of first downstream components.

14. The computing system of claim 10, wherein the one or more processor devices further:
apply an input to the second component of the second group of components wherein the input is an output of the first component, and identifying components referenced by the second component based on the input;

iteratively apply pluralities of inputs to each of the components referenced by the second component to identify a group of second downstream components; and identify the first set of inactive components by determining that the second set of inactive components are not in the group of second downstream components.

15. The computing system of claim 10, wherein the one or more processor devices further:

determine that that a modification has been made to the first file; and update the first set of inactive components and the second set of inactive components.

16. A non-transitory computer-readable storage medium that includes executable instructions to cause one or more processor devices of one or more computing devices to:

receive a first file comprising a first group of components written in accordance with a first notation syntax and a second file comprising a second group of components written in accordance with a second notation syntax, wherein a first component in the first group of components comprises a reference to a second component of the second group of components;

identify a first set of inactive components of the first group of components by iteratively applying a plurality of inputs to an initial component in the first group of components and determining that a downstream component in the first group of components is not referenced in response to the plurality of inputs;

identify a second set of inactive components of the second group of components based on the reference to the second component of the second group of components, wherein the first group of components and the second group of components that are not in the first set of inactive components and the second set of inactive components are active components; and generate computer-executable code operable to be subsequently executed based on the active components by a business process automation platform, wherein the computer-executable code omits the first set of inactive components and the second set of inactive components and includes the active components.

\* \* \* \* \*